(12) United States Patent
Berry et al.

(10) Patent No.: US 6,311,522 B1
(45) Date of Patent: Nov. 6, 2001

(54) PROCESS FOR CASTING AND FORMING SLAG PRODUCTS

(75) Inventors: Richard Berry, St. Catharines; Brian Reeves, Hamilton, both of (CA)

(73) Assignee: Slaytech Inc., St. Catharines ( * ) Notice: Subject to any disclaimer, the term of this patent is extended or adjusted under 35 U.S.C. 154(b) by 0 days.

(21) Appl. No.: 09/353,034

(22) Filed: Jul. 13, 1999

(51) Int. Cl.[7] .................................................. C04B 5/00
(52) U.S. Cl. .......................... 65/19; 65/33.1; 65/60.1; 65/134.1; 65/134.8; 65/134.9; 65/141
(58) Field of Search ........................... 65/19, 33.1, 60.1, 65/134.1, 134.8, 134.9, 141

(56) References Cited

U.S. PATENT DOCUMENTS

| | | | | |
|---|---|---|---|---|
| 2,217,808 | * | 10/1940 | Nye ........................................... | 65/19 |
| 3,677,728 | * | 7/1972 | Kitaigorodsky ........................... | 65/19 |
| 3,761,235 | * | 9/1973 | Yamanaka et al. ....................... | 65/19 |
| 3,822,799 | * | 7/1974 | Evans ........................................ | 65/19 |
| 3,942,966 | * | 3/1976 | Kroyer et al. ............................ | 65/19 |
| 4,711,662 | * | 12/1987 | Harada ..................................... | 65/19 |
| 5,558,690 | * | 9/1996 | Hnat et al. ................................ | 65/19 |

* cited by examiner

Primary Examiner—Michael P. Colaianni

(57) ABSTRACT

The present invention relates to a process and apparatus to cast and form slag directly from the molten state into crystalline or amorphous products suitable for use as decorative and structural building and construction materials. Molten slag and additives are refined at high temperature in a treatment furnace for a period of hours. The eventual entrapped gas content is controlled using a variety of methods, such as vacuum pressures and bottom stirring with inert gas. The molten slag is cast directly into moulds, and these moulds form the slag into any shape desired. The formed products are immediately introduced into a heat treatment furnace at temperatures at or above the glass transition temperature (GTT) for the case of crystalline products, or just below the GTT for amorphous products. The product is thermally cycled over a period of hours to relieve thermal stresses during cooling to ambient temperatures. If desired, the product can be coated using enamel or glaze and cured in another furnace, or metal plated.

16 Claims, 1 Drawing Sheet

PROCESS FOR CASTING AND FORMING SLAG PRODUCTS

BACKGROUND OF THE INVENTION

1. Field of the Invention

This invention relates to the reuse (i.e. not recycling) of slag, a waste by-product of the metals refining industry, through specialized treatment to create high-value by-products. In particular, it relates to controlled casting and forming of slag to create structural and decorative construction materials, such as tiles, bricks, blocks, etc. The structural and decorative construction materials of the present invention can be used for interior and exterior of buildings; for use as low-impact, high-abrasion wear linings (e.g. in chutes, etc.); non-skid applications (e.g. flooring and tiles); and for use in almost all current applications of pre-cast concrete.

Traditionally, slags of the steel industry have been slow-cooled or water-quenched and reused as construction aggregate. This traditional method of cooling results in coarse crystals and other inhomogeneities in the slag. While this may be quite satisfactory for road aggregate, it is not typically desirable for uses in buildings where high strength and wear resistance are required.

The present invention reduces the inhomogeneities in the final slag product by regulating the temperatures and lengths of the 'fining' and 'forming' cycles, as well as by controlling the casting temperature and slag additives. The resulting product is strong, stable and structural, formed into various desired shapes, suitable for building and construction materials and other applications requiring high-strength, low-abrasion or non-skidding.

2. Description of the Prior Art

As noted above slags of the metal refining industry have traditionally been slow-cooled or water-quenched and reused as construction aggregate. Some efforts have been made to develop alternative uses for the slag as structural and decorative construction materials. None of these prior efforts has to date been commercially successful.

Canadian Patent No. 326838 describes a process of directly casting molten slag into moulds for shapes suitable for construction. In this process molten slag is tapped into a cylindrical vessel where it is stirred to liberate entrapped gases and cooled to lower its viscosity. These evolving gases create gas pockets within the slag, and lower viscosity is sufficient to hold the bubbles in the molten viscous or plastic state so that a solidified foam or cellular structure eventually results. This foamed slag is tapped and cast into moulds in shapes of building blocks or bricks.

The resulting solidified slag product is not likely to consistently form a strong structural building material. Casting slag directly from molten temperatures to ambient temperatures results in thermal stresses in the final product. This final product either spontaneously shatters upon cooling, or at best is very weak structurally. This rapidly cooled material can vitrify (i.e. become glassy or amorphous) rather than crystallize. In addition, this method claims to be able to create a dense structure (i.e. with little or no porosity) by circumventing any gas evolution from the slag during cooling. However, the creation of a dense structure without voids requires complete entrapped gas evolution; without extensive gas evolution, any untreated slag produces gas bubbles in the final product whether desired or not. Finally, this method of treatment does not include any compositional modifications to the slag (i.e. additions intended to change the overall chemistry).

In another process developed in the UK and known as Slagceram, decorative and structural construction materials, especially tiles, are made by a process of glass-making and controlled devitrification. Simply, a glass product is formed from thermally and compositionally treated blast furnace slag and cooled to ambient temperature. Then this product is again thermally treated to devitrify the slag; that is, to cause the glass structure to become crystalline. In this process molten slag is tapped from a blast furnace or transfer vessel into a slag treatment vessel. This treatment vessel is heated by some means, such as natural gas or induction. To form a molten glass, sand is added into the molten slag in a ratio of 30 parts sand to 100 parts slag. A nucleating agent is also added to induce uniform crystal growth. The entire mixture is held for a number of hours at a constant temperature (1430° C. for five (5) hours), the 'fining' period, to allow volatiles to escape (e.g. entrapped gases) and ensure complete dissolution of the additives. When the fining time has elapsed, the slag glass is poured and shaped below its glass transition temperature into the final product form (e.g. tile) using glass-making machinery. The slag glass product is thermally cycled for a number of hours to ambient temperature, and then moved to a secondary heat-treatment furnace.

In this furnace, the glass product is heated just above its glass transition temperature to the nucleation temperature, where the added nucleating agents will create sites for crystalline grain growth. After an appropriate number of nucleation sites have been formed, the temperature is increased to the grain growth temperature where small grains are grown from these sites. The resulting slag glass ceramic product is cooled to ambient temperature, ready for use, or enameled if desired.

The emphasis of the Slagceram process is to create a glass ceramic; that is, to first make a formed glass product with a number of nucleating agents, and then thermally treat the product to allow nucleation and crystalline grain growth.

U.S. Pat. No. 5,720,835 relates to the manufacture of a multi-layer tile, using slag as one of the potential components of the lower, strength-giving layer. The multi-layer tile consists of at least two layers of different material sintered together, where the top layer is made of sintered glass or other more decorative, less strong material, and the underlying layer or layers are composed of stronger materials (sand, slag granulate, crushed glass granulate) sintered together with a bonding agent that gives the tile its overall strength.

SUMMARY OF THE INVENTION

It is an object of the invention to provide a process to cast and form slag directly from the molten state into crystalline or amorphous (i.e. glassy) products suitable for use as decorative and structural building and construction materials.

It is a further object of the invention to provide an improved method of controlling the entrapped gas content of the slag based product.

It is a further object of the invention to provide a process of controlled heat cycling to relieve the thermal stresses in the cast and formed product, Thus in accordance with the present invention there is provided a process for controlled casting and forming of structural and decorative construction materials consisting of the following steps:

(a) waste oxides, either molten or solidified, are delivered to a slag treatment vessel;

(b) additives selected from the group consisting of other industrial by-products, such as other slag types, bag-house dusts, scrap glass, etc, specialty ceramic materials such as silica, zirconia, alumina and others are added in an amount equal to 5 to 35% by weight of waste oxide;

(c) the contents of the slag treatment vessel are heated to a fining temperature of between 1200° C. to 1700° C. to dissolve all the additives into a melted oxide;

(d) the melted composition is held at the fining temperature for a period of one half (½) to five (5) hours to help burn off volatiles and control the rate of dissolved gas formation;

(e) the melted composition is then cast into moulds at a controlled temperature, called the casting temperature. The casting temperature varies depending on the desired physical state of the final product. For an amorphous product, the casting temperature ranges from 100° C. below the glass transition temperature (GTT) up to the GTT. For a crystalline product, the casting temperature ranges from the GTT up to the fining temperature. The GTT varies with the final chemical composition of the product, but is likely to be in the range from 600 to 800° C.

(f) the cast product is immediately conveyed through one or more thermal treatment furnaces for a heating/cooling cycle of finite period of time. The treatment cycle is dependent on the mass and volume of the product and the final desired microstructure. For an amorphous product, the sample is held for 1 to 10 hours at the casting temperature and slow-cooled to ambient at a rate that the temperature distribution in the volume of the product should be equalized. In the simplest case for the crystalline product, the product is slow-cooled from its casting temperature at a rate that the temperature distribution in the volume of the product should be equalized. If crystal growth is desired in the final microstructure, the product's temperature is either increased, or slowly decreased (using the same controlled rate as described previously), to the crystal growth temperature, which is likely to be in a range between 850 to 1100° C. The product is held at this temperature between one (1) and ten (10) hours, then slow-cooled to ambient temperatures in the same controlled rate as described previously.

The principle of the invention is to cast and form slag directly from the molten state into crystalline or amorphous products suitable for use as decorative and structural building and construction materials. Molten slag and additives are refined at high temperature in a treatment furnace for a period of hours. The eventual entrapped gas content is controlled using a variety of methods, such as vacuum pressures and bottom stirring with inert gas. The molten slag is cast directly into moulds, and these moulds form the slag into any shape desired. The formed products are immediately introduced into a heat treatment furnace at temperatures at or above the glass transition temperature (GTT) for the case of crystalline products, or just below the GTT for amorphous products. The product is thermally cycled over a period of hours to relieve thermal stresses during cooling to ambient temperatures. If desired, the product can be coated using enamel or glaze and cured in another furnace, or metal plated.

This invention overcomes a number of the problems or limitations of the prior art. First, it improves the method of controlling the entrapped gas content over the agitator method described in Canadian Patent No. 326838. Second, this invention uses controlled heat cycling to relieve the thermal stresses in the cast and formed product, which was not taken into consideration in the aforementioned patent. Third, it directly forms a crystallized product, unlike Slagceram that requires the intermediate formation of a glass and subsequent conversion to a crystallized ceramic. Finally, this process can form any shape desired, and is not limited to flat, layered products as in the last example of the prior art. It does not create a sintered product of aggregate materials, but rather a dense product of continually solid material.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF THE PREFERRED EMBODIMENT

Figure 1:
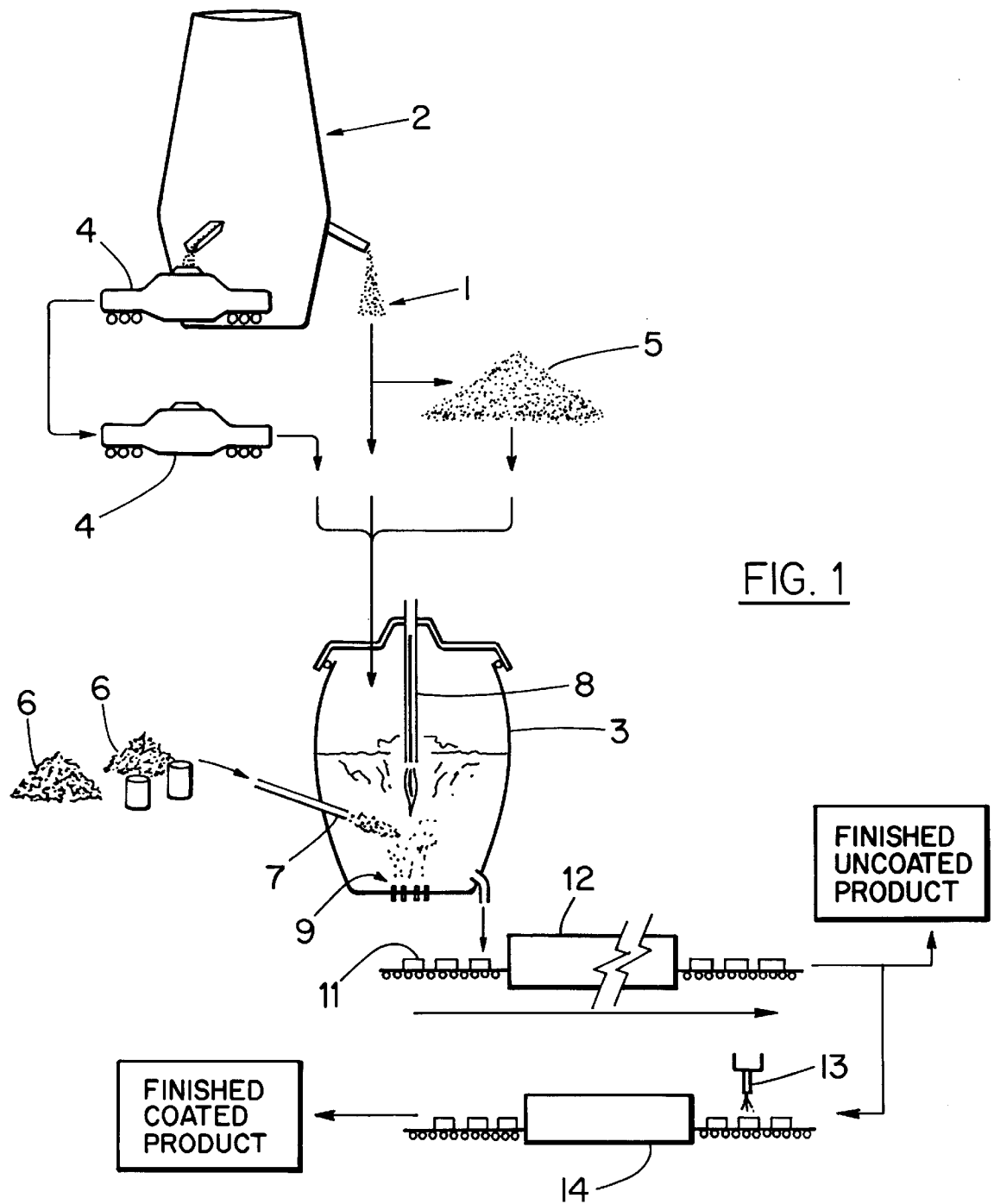
FIG. 1 is a schematic illustration of a process and apparatus according to the present invention.

Referring to FIG. 1, a process and apparatus for controlled casting and forming of slag to create structural and decorative construction materials, such as tiles, bricks, blocks, etc. is provided by the present invention.

The process of the present invention is applicable to waste oxides and in particular slag from any metals refining vessel including blast furnace slag, steelmaking slag, ladle furnace slag, and nickel furnace slag. In the preferred embodiment molten slag 1 is tapped directly from a metals refining vessel 2 into a slag treatment vessel 3. However, where logistics prohibit use of direct tapping of molten slag, the slag can be carried in a slag transport vessel 4 from the metals refining vessel 2 to the slag treatment vessel 3 or slag 5 which has already been solidified in slag pits can be used.

The slag, molten or otherwise, is delivered to a slag treatment vessel 3 where a number of processing steps will take place prior to slag casting and forming into the final product shape. This vessel 3 is preferably refractory insulated and stand alone. However, the treatment vessel can also be a slag transport vessel, or even slag runners if necessary.

Additives 6 selected from the group consisting of other industrial by-products, such as other slag types, bag-house dusts, scrap glass, etc, specialty ceramic materials such as silica, zirconia, alumina and others are used to adjust the chemical composition of the slag product for the suitability of its final application. The additives 6 are added in an amount equal to 5 to 35% by weight of slag and can be introduced into the vessel in a variety of means. Preferably, the additives are added in finely-divided form by lance injection 7 with a carrier gas. Alternatively, the additives can be top-charged in lumpy form. If a different slag is used as an additive, it can be added in a molten state from another tap stream or transfer vessel. The additives can also be introduced in the slag stream raw feed.

The contents of the slag treatment vessel 3 are heated to a range between 1200° C. to 1700° C. to both assist in dissolving all the additives into the melt and maintain the melt at specific temperature, known as the fining temperature. The slag treatment vessel 3 may use as a heating means 8 a plasma torch, electric arc, natural gas, induction or electrical resistance to generate the heat required.

The melted composition of slag and additives is held at the fining temperature for a period of one half (½) to five (5)

hours. The purpose of the fining period is to help burn off volatiles and control the rate of dissolved gas formation. Gas formation may or may not want to be desirable, depending on the final porosity of the product application. Agitation means 9 such as bottom bubbling with an inert gas, or other forms of agitation or stirring, can further control the evolution of gases. Shrouding the vessel 3 in a vacuum can further control the evolution of dissolved gases. Decreasing the internal pressure lowers the equilibrium amount of gaseous species that can exist within the slag, causing more gas to leave the system. Thus, less gas will be present during casting.

After the appropriate fining time, the melted slag composition is tapped from the treatment vessel 3. Casting is performed at a controlled temperature, and the ranges dependent on the desired physical state of the final product; from 100° C. below the glass transition temperature (GTT) up to the GTT for amorphous products, and from the GTT temperature to the fining temperature for crystalline products. The higher the temperature, the more fluid the slag composition; therefore, the more easily it can fill the mould. The lower the temperature, the more viscous the slag; therefore, the less likely that dissolved gases, which form upon cooling, can rise through the product and mar its surface. The cast slag composition is formed in moulds 11 of desired shape and size. These moulds can be made from a variety of materials, including but not limited to high-temperature corrosion resistant metals (stainless steel, nickel alloys, etc.), graphite and stamped sand.

The cast product in moulds 11 is immediately conveyed through one or more thermal treatment furnaces 12 for a heating/cooling cycle of finite period of time. The treatment cycle is dependent on the mass and volume of the product and the final desired microstructure. For an amorphous product, the sample is held for 1 to 10 hours at the casting temperature and slow-cooled to ambient at a rate that the temperature distribution in the volume of the product should be equalized. In the simplest case for the crystalline product, the product is slow-cooled from its casting temperature at a rate that the temperature distribution in the volume of the product should be equalized. If crystal growth is desired in the final microstructure, the product's temperature is either increased, or slowly decreased (using the same controlled rate as described previously), to the crystal growth temperature, which is likely to be in a range between 850 to 1100° C. The product is held at this temperature between one (1) and ten (10) hours, then slow-cooled to ambient temperatures in the same controlled rate as described previously.

The differences in processing between crystalline and amorphous products is shown in Table 1.

TABLE 1

Differences between crystalline and amorphous products (GTT = glass transition temperature).

| | Desired Physical State of Final Product | |
|---|---|---|
| | Crystalline | Amorphous |
| Fining Range | 1200 to 1700° C. | 1200 to 1700° C. |
| Casting Temperature | GTT to Fining Temperature | (GTT-100° C.) to GTT |
| Heat Treatments | (i) Stablize product at 850° C. to 1100° C., hold for 1 to 10 hours, and slow-cool to ambient. (ii) Slow-cool from casting temperature to ambient. | Hold for 1 to 10 hours at casting temperature and slow-cool to ambient. |
| Advantages | more consistant microstructure Higher impact strength and abrasion resistance. lower energy costs than (i) while still retaining crystalline structure. | lowest energy costs. |

The purpose of this thermal treatment is to relieve thermal stresses in the product. The temperature cycle and duration depends on the volume of cast product and final application of the product. When cooled to ambient temperature, the final raw product is ready.

The final product surface can be treated with a coating if desired. Possible surface treatments 13 include spray-on enamels and glazes of a variety of colours and finishes. Alternatively the surface may be plated. After the surface treatment is applied the product enters a curing furnace 14. The maximum temperature of an enamelled product is hundreds of degrees Celsius less than that for ceramic glazes. The surface treated product is now ready for market.

EXAMPLES

The following are examples of finished products created using the process.

Example 1

Tiles of sizes ranging from 2" by 2" by_inch to 4" by 6" by_inch were created. These were produced on site at an integrated steelmaking mill on over ten (10) occasions. Molten blast furnace slag was taken directly from the slag runners, scooped into a #50 refractory-lined graphite crucible and transported to a nearby work-site. Approximately 6 kg of molten slag was taken. Varying additions were added into the crucible up to thirty (30) weight percent of the original molten slag in different combinations: 0 to 30% glass shards, 5 to 30% steelmaking slag, 0 to 10% silica, 0 to 30% ladle slag, 0 to 30% nickel furnace slag and 0 to 5% zirconia. The entire mixture was increased to over 1600° C. using carbon arc heating electrodes and maintained at that temperature for periods of one-half (½) to two (2) hours for fining. The molten mixture was then cast into stainless steel or graphite moulds that were in an electrical resistance furnace at temperatures ranging from 700° C. to 950° C. The moulded products were either heated to or held at 950° C., held at 950° C. for up to four (4) hours and slow-cooled to ambient temperature for over 12 hours, or slow-cooled directly to ambient temperature for over 12 hours. Tiles produced in this example were crystalline, strong, gray in colour, and an almost two-fold increase in impact strength and abrasion resistance than average commercial grade ceramic tile.

Example 2

Tiles were produced as in Example 1 except that the blast furnace slag was not taken in its molten state from the blast furnace runners but heated directly from ambient temperature. The amount of blast furnace slag was 1 kg in a #5 refractory lined graphite crucible. Additions were added in the same regard as Example 1. Casting and treatment cycles were also similar.

Example 3

Tiles were produced as in Example 2 except steelmaking slag was interchanged with blast furnace slag (i.e. the majority of the product was made from steelmaking slag). The tiles produced were stronger, possessed greater impact strength and abrasion resistant, and were darker in colour and denser than the tiles produced with predominately blast furnace slag.

Example 4

Tiles were produced as in Example 2 except ladle furnace slag was interchanged with blast furnace slag (i.e. the majority of the product was made from ladle slag). The tiles produced were lighter in colour and less dense than the tiles produced with predominately blast furnace slag.

Example 5

Tiles were produced as in Example 2 except nickel furnace slag was interchanged with blast furnace slag (i.e. the majority of the product was made from nickel furnace slag). The tiles produced were darker in colour and denser than the tiles produced with predominately blast furnace slag.

Example 6

Tiles were produced as in Example 2 except the fining temperature and the casting temperature were both 1450° C. The crucible containing the blast furnace slag and additives was heated in an electrical resistance, and the contents were immediately poured into a graphite mould within the same furnace. This was held at 1450° C. for several hours and slow-cooled to ambient temperature. This meld of casting at the fining temperature produced an even stronger tile than that produced in Example 2.

Example 7

Tiles produced in Examples 1 and 2 were subsequently coated with coloured enamel and cured at a temperature between 75 and 150° C. The surface treatment was continuous and retained its colour.

Example 8

Tiles produced in Examples 1 and 2 were subsequently applied with coloured ceramic glaze and cured at a temperature between 955 and 1150° C. The surface treatment was continuous and retained its colour.

Example 9

A tile produced in Example 2 was plated with bronze. The surface treatment was continuous and retained its colour.

Example 10

Amorphous tiles were produced using the same process as in Examples 1 and 2, except the casting temperature was from 650 to 680° C. The product was held at this temperature for a period of four (4) hours and then slow-cooled to ambient temperature. The tiles were either dark and opaque or green and transparent, depending on the variation in additions.

Example 11

A large decorative garden ornament was created as in Example 1. To the seven (7) kg of blast furnace slag, 12 weight percent steelmaking slag and 15 weight percent glass shards was added. The entire mixture was cast into a large sand mould, immediately put into a heat treatment furnace at 750° C., held for three (3) hours and slow-cooled to ambient temperature. The sand mould was stamped in a shape of a sun figure. The final product retained the complex shape of the sand mould. The product was approximately 33 cm in diameter, 3 cm thick and weighed 7.1 kg.

Table 2 shows the relative differences in product properties with different slags as the predominate constituent.

TABLE 2

Relative measure of product properties with different slags as primary constituent.

| Property | Blast Furnace Slag | Steelmaking Slag | Nickel Furnace Slag | Ladle Slag |
| --- | --- | --- | --- | --- |
| Density | Medium | High | High | Lowest |
| Impact Strength | High | Very High | High | Lowest |
| Abrasion Resistance | High | Very#Iigh | High | Lowest |
| Colour | Gray | Dark | Dark | Lightest |

Having illustrated and described a preferred embodiment of the invention and certain possible modifications thereto, it should be apparent to those of ordinary skill in the art that the invention permits of further modification in arrangement and detail. All such modifications are covered by the scope of the invention.

The embodiments of the invention in which an exclusive property or privilege is claimed are defined as follows:

1. A process for controlled casting and forming of structural and decorative construction materials consisting of the following steps:

(a) first waste oxides, either molten or solidified, are delivered to a slag treatment vessel;

(b) additives selected from the group consisting of other industrial by-products selected from the group consisting of second waste oxides different than the first waste oxides, slag types, bag-house dusts, scrap glass, silica sand, and specialty ceramic materials selected from the group consisting of silica, zirconia, alumina and others are added in an amount equal to 5 to 35% by weight of the aforementioned first waste oxides;

(c) the contents of the slag treatment vessel are heated to a fining temperature of between 1200° C. to 1700° C. to dissolve all the additives and first waste oxides into a melted oxide;

(d) the melted oxide is held at the fining temperature for a period of one half (½) to five (5) hours to help burn off volatiles and control the rate of dissolved gas formation;

(e) the melted oxide is then cast into moulds at a controlled casting temperature to directly form a cast crystallized product without intermediate formation of a glass; and then (f) the cast crystallized product is immediately conveyed through one or more thermal treatment furnace for a heating/cooling cycle of finite period of time to relieve thermal stresses in the cast crystallized product.

2. A process according to claim 1 wherein said first waste oxide is slag from any metals refining vessel.

3. A process according to claim 2 wherein the slag is selected from the group consisting of blast furnace slag, steelmaking slag, ladle furnace slag, and nickel furnace slag.

4. A process according to claim 3 wherein the slag is molten and is tapped directly from a metals refining vessel into a slag treatment vessel.

5. A process according to claim 3 wherein the slag is carried in a slag transport vessel from the metals refining vessel to the slag treatment vessel.

6. A process according to claim 3 wherein the slag is slag which has already been solidified in slag pits.

7. A process according to claim 1 wherein said additives are introduced into the vessel in a finely-divided form by lance injection with a carrier gas.

8. A process according to claim 1 wherein the additives are top-charged in lumpy form.

9. A process according to claim 1 wherein where the additive consists of a different slag type, the different slag type is added in a molten state from another tap stream or transfer vessel.

10. A process according to claim 2 wherein the additives are introduced into the slag stream raw feed.

11. A process according to claim 1 comprising the additional step in the slag treatment vessel of bottom bubbling with an inert gas, or other form of agitation or stirring, to control the evolution of gases.

12. A process according to claim 1 wherein said one or more thermal treatment furnace is shrouded in a vacuum to control the evolution of dissolved gases.

13. A process according to claim 1 wherein the casting temperature of the cast crystalline product ranges from the GTT up to the fining temperature.

14. A process according to claim 13 wherein the GTT is in the range from 600 to 800° C.

15. A process according to claim 13 wherein the cast crystalline product's temperature is either increased, or slowly decreased to the crystal growth temperature in a range between 850 to 1100° C. and held at this temperature between one (1) and ten (10) hours during the heating/cooling cycle then slow-cooled to ambient temperatures.

16. A process according to claim 1 wherein the cast crystalline final product surface is treated with a coating after the heating/cooling cycle.

* * * * *